(12) United States Patent
Johnson

(10) Patent No.: US 6,543,790 B2
(45) Date of Patent: Apr. 8, 2003

(54) AIRCRAFT TOWBAR

(76) Inventor: Raymond W. Johnson, 101 Halsey Ave. NE., Buffalo, MN (US) 55313

( * ) Notice: Subject to any disclaimer, the term of this patent is extended or adjusted under 35 U.S.C. 154(b) by 18 days.

(21) Appl. No.: 09/877,447

(22) Filed: Jun. 11, 2001

(65) Prior Publication Data

US 2002/0185839 A1 Dec. 12, 2002

(51) Int. Cl.7 .............................. B60D 1/14; B64F 1/04
(52) U.S. Cl. ............................. 280/3; 180/904; 244/50; 280/503
(58) Field of Search ................................ 280/493, 503, 280/DIG. 11, 3; 180/904, 19.1, 20; 244/50

(56) References Cited

U.S. PATENT DOCUMENTS

| | | | |
|---|---|---|---|
| 2,391,608 A | * | 12/1945 | Wood |
| 2,846,018 A | * | 8/1958 | Puckett |
| 2,877,911 A | * | 3/1959 | Arnot |
| 2,944,837 A | * | 7/1960 | Fotheringham |
| 3,049,253 A | * | 8/1962 | Cabral |
| 3,598,259 A | * | 8/1971 | Wright |
| 3,995,878 A | * | 12/1976 | Geraci et al. ............... 280/503 |
| 4,057,158 A | * | 11/1977 | Lissy ......................... 244/50 |
| 4,269,429 A | * | 5/1981 | Eichstadt ................... 280/503 |
| 4,470,564 A | * | 9/1984 | Johnson ..................... 224/50 |
| 4,883,280 A | * | 11/1989 | Christian ..................... 244/50 |
| 4,991,862 A | | 2/1991 | Tsao ........................... 280/421 |
| 5,013,205 A | | 5/1991 | Schardt ...................... 414/429 |
| 5,078,418 A | | 1/1992 | Kalmanson ................. 280/504 |
| 5,104,279 A | | 4/1992 | Melnick ..................... 414/428 |
| 5,129,667 A | | 7/1992 | Gratton ...................... 180/904 |
| 5,494,310 A | * | 2/1996 | Soles .......................... 280/493 |

\* cited by examiner

*Primary Examiner*—Anne Marie Boehler
(74) *Attorney, Agent, or Firm*—Thomas J. Nikolai; Nikolai & Mersereau, P.A.

(57) ABSTRACT

A towbar for the towing of aircraft which will enable the user to attach the same to, selectively, the front nose wheel or the front wheel strut of an aircraft. The towbar includes a longitudinally extending towing bar with a vehicle attachment on one end thereof to facilitate attachment to a towing vehicle with the other end thereof provided with a pair of arms to engage the nose wheel or strut. The arms are openable and closeable for attachment to the wheel or strut and the mechanics for opening and closing are arranged within the longitudinal towing bar. The mechanism for opening and closing includes a slide moveable on the bar in a longitudinal direction and a structure for converting this longitudinal motion to rotational motion for rotating an arm control rod which, through a threaded end and threaded bearing will move one arm with respect to the other.

5 Claims, 2 Drawing Sheets

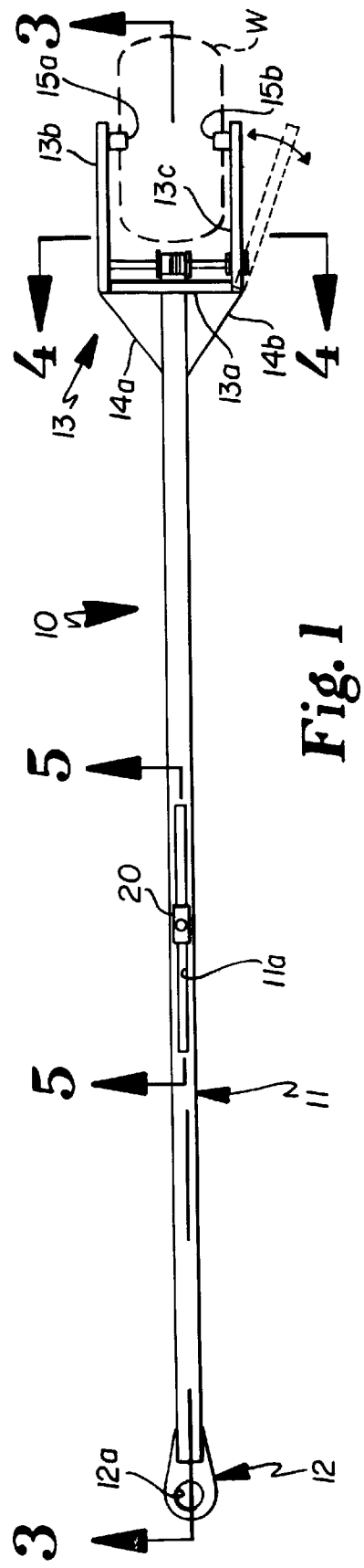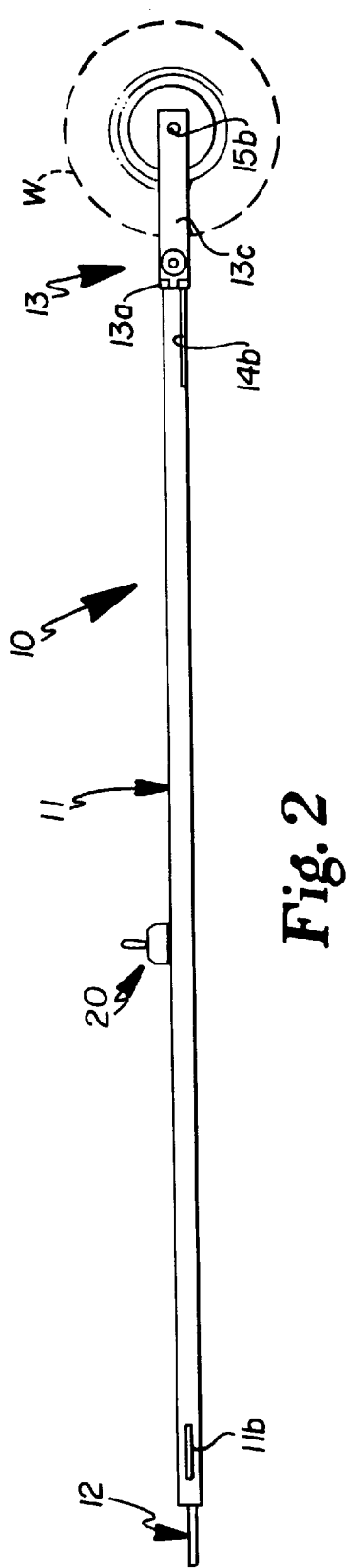
Fig. 1
Fig. 2

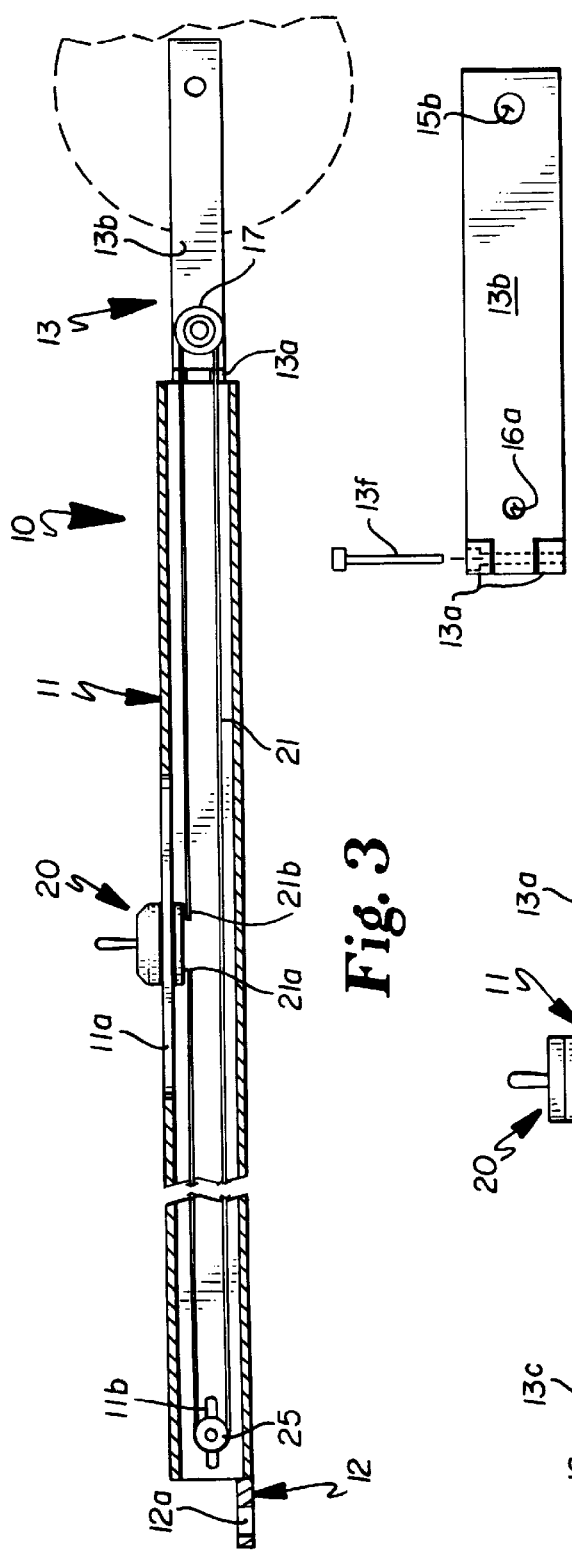
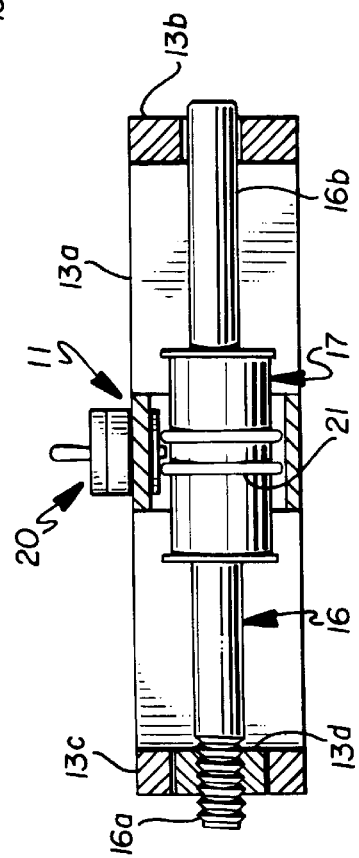
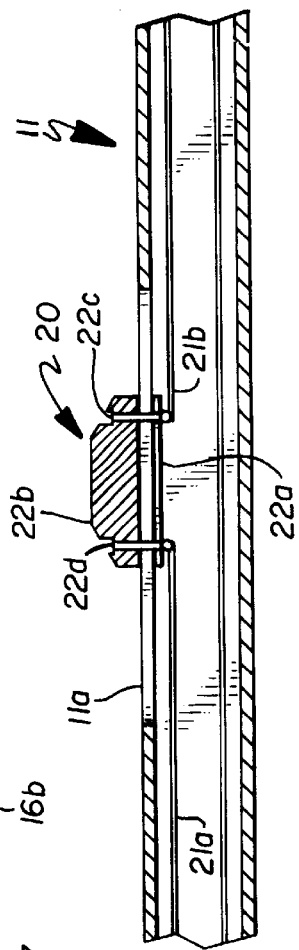

AIRCRAFT TOWBAR

RELATED APPLICATIONS

Applicant has not filed nor is he aware of any applications on file by others that would be pertinent to the prosecution of this application.

SPONSORSHIP

This invention is through the sole efforts of the listed applicant and has not been made under any Federal or Independent sponsorship.

FIELD OF THE INVENTION

This invention relates generally to a device for the towing of vehicles and more specifically to a towbar for aircraft which include a nose wheel and normally includes a nose wheel strut wherein the towbar includes means for attachment of the same on one end thereof to a towing vehicle and means for connecting the other end thereof to either the nose wheel of the aircraft or to the strut of the nose wheel such that the same may be positioned for towing the aircraft. The control or operative portions of the nose wheel attachment are housed within the towbar.

SHORT SUMMARY OF THE INVENTION

A towbar for aircraft which provides a longitudinally extending towing bar, means for attaching one end of the bar to a towing vehicle and means for releasably attaching the other end to the nose wheel or nose wheel strut of the aircraft. The operative means for connecting the nose wheel or strut attachment end are housed within the extending towing bar that allows manipulation and placement of the nose wheel or strut attachment end to the wheel or strut from a standing position in front of the aircraft.

Various towing devices are available for various vehicles but the applicant is not aware of any such device which is directed to use with aircraft which allows for attachment of the same to the craft through a relatively remote control mechanism.

With the applicant's device, a remote control permits the aircraft connective end to engage either the nose wheel hub, axle area or the nose wheel strut to apply towing power thereto. The length and lightness of the unit allows one person operation without requiring the person to obtain his or her physical access to the wheel and, thereafter, connect the same to the towing vehicle or to pull the same himself or with other persons.

It is therefore an object of the applicant's invention to provide a towing device for aircraft which allows for remote connective attachment of one end of the same to the nose wheel or nose wheel strut of the aircraft and attachment of the other end of the device to a towing means.

It is a further object of the applicant's invention to provide a towing device for aircraft through manipulation of a single control element that converts longitudinal movement of the control element to rotational power to open and close a pair of wheel grasping arms or tines which are thereby releasably affixed to the aircraft for towing purposes.

It is still a further object of the invention to provide an aircraft towing device to enable the user to removably attach the same to the nose wheel or nose wheel strut of the aircraft without requiring the user to come into contact or close association to the nose wheel or strut.

These and other objects of the invention will more fully appear from a consideration of the accompanying drawings and disclosure.

SHORT DESCRIPTION OF THE DRAWINGS

FIG. 1 is a top plan view of the aircraft towing device embodying the concepts of the invention, illustrating the nose wheel of an aircraft in dotted lines;

FIG. 2 is a side view thereof,

FIG. 3 is a vertical section taken substantially along Line 3—3 of FIG. 1

FIG. 4 is a vertical section taken substantially along Line 4—4 of FIG. 1;

FIG. 5 is a vertical section taken substantially along Line 5—5 of FIG. 1; and,

FIG. 6 is a detail of the rotatable connection between portions of the wheel connective arms of the device.

DESCRIPTION OF A PREFERRED FORM OF THE INVENTION

In accordance with the accompanying drawings, the towbar embodying the concepts of the applicant's invention is generally designated 10 and primarily includes three elements which are defined as a longitudinally extending towing bar section 11, a vehicle attachment section 12 on one end thereof and a bifurcated wheel attachment end 13 on the other end thereof.

The longitudinally extending towing bar 11 includes a generally rectangular tubular member within which the control elements, described hereinafter, are provided. The vehicle attachment end 12 may be a single plate having an aperture 12a therethrough to be placed about a tow ball of a vehicle. Obviously this attachment end 12 may take any one of many known shapes.

The wheel attachment end 13 includes a first cross bar 13a arranged normal to the axis of the towing bar 11 reinforced with gussets 14a, 14b and a pair of arms 13b, 13c. The first of such arms 13b is rigidly secured to cross bar 13a with the second such arm 13c being rotatably mounted on a bifurcated end of cross bar 13a through pin 13f. Each of the arms 13b, 13c are provided with wheel or strut engaging bosses or other towing attachments 15a, 15b to be received either into the hub of the nose wheel W of the aircraft or to pins which are often available on the nose wheel strut of the aircraft. Other means of attachment are often provided, dependent upon the aircraft manufacturer. Either engagement will effectively connect the aircraft to the towbar 10.

In order to obtain the necessary pivotal movement of arm 13c, it is, as stated, pivotally mounted to cross arm 13a and the mechanism for moving the same is best illustrated in FIG. 4. A shaft 16 having a threaded end 16a is provided to extend between arms 13b, 13c and a threaded bushing 13d to receive such end 16a is provided in arm 13c. End 16b is mounted in arm 13b to accomodate such this movement. As should be obvious, as the arms 13b, 13c move relative to each other and arm 13c moves relative to cross arm 13a, bushing 13d, must allow for such angular shifting and may be flexibly mounted with respect to the arm 13c.

It should be obvious that, although the drawings illustrate arm 13c as being the movable arm, that either of the arms may be mounted in the same manner such that either a left or right side operation is the active arm while the other will remain in fixed position.

To obtain rotative movement of shaft 16, an enlarged pulley 17 may be provided such that a connective link such as cable 21 may encircle the same.

Rotative power is delivered to pulley 17 and thus shaft 16 through movement of the connective link or cable 21 as described hereinafter.

The described connection converts longitudinal or linear movement of link or cable 21 wherein the link 21 extends internally of towing bar 11 to a control slide 20. As illustrated, slide 20 is mounted and moves within a groove 11*a* and the ends 21*a*, 21*b* of such link or cable 21 are affixed to the inner member 22*a* thereof Preferably this inner member 22*a* of slide 20 is of a low friction material. The upper section 22*b* of slide 20 includes, preferably, a low friction surface to ride upon towing rod 11. The upper section 22*b* and lower section 22*a* thereof are joined by connecting elements 22*c*, 22*d*.

In this manner, as slide 20 is moved longitudinally within groove 11*a*, the connective link or cable 21 rotates threaded rod 16 to cause the arm 13*c* to move with respect to the stationary arm portions 13*a*, 13*b* of such end.

In order to maintain proper tension of the connective link or cable 21, an idler pulley 25 is provided in a transverse slot 11*b* in the forward most end of towing bar 11. Various mechanical means are known for positioning such an idler pulley 25 to maintain proper driving tension from slide 10 through link or cable 21 to threaded rod 16. The path of the connective link 21 then, should be obvious in that, ideally it will encircle the enlarged section 17 of threaded rod 16 to transmit rotative motion thereto, extend around idler pulley 25 and be connected at the ends thereof to the slide 20.

In operation, the arms 13*b*, 13*c* of connective end 13 will be spread by sliding control slide 20 along towing bar 11, the first stationary arm 13*b* attachment end 15*a* will be positioned in the hub or axle opening of the aircraft wheel and the boss 15*b* of the movable arm 13*c* will be brought into registration therewith and slide 20 will be reversally moved to reverse the movement of rod 16 to close the arms 13*b*, 13*c* into wheel or strut grasping registration.

The length of towing rod 11 is arbitrary but should be of a dimension to allow the user to control and position the same in a standing position.

The concept of the applicant's invention is to provide a positive grasping element having a simple control mechanism for actuation thereof and, with the structure illustrated, it should be obvious that it will not be possible to spread the arms of the connective end of the same without movement of the control slide such that the unit will be in a positive position for towing until the slide is acted upon by the user.

What is claimed is:

1. An aircraft towing device arranged and constructed to connect to the nose wheel of or to engage the nose wheel strut of an aircraft including:
   (a) a longitudinally extending towing bar;
   (b) a cross arm disposed at one end of said towing bar, said cross arm supporting a pair of arms at outward ends thereof where one of said pair of arms is rotatably mounted to one of said outward ends of said cross arm;
   (c) one of said pair of arms being shiftable with respect to the other such arm to increase and decrease the spacing between ends of said arms, whereby the nose wheel or wheel strut of an aircraft may be secured between said pair of arms;
   (d) a rotatable rod member having a threaded end received into the shiftable one of the pair of arms;
   (e) a longitudinally shiftable slide member arranged on said towing bar; and
   (f) a cable coupled between the slide member and the rotatable rod member whereby longitudinal shifting of the slide member is converted to rotation of the rotatable rod member.

2. The aircraft towing device as set forth in claim 1 and said cable including an endless flexible connector between said slide member and said rotatable rod member whereby longitudinal movement of said slide member is converted to rotation of said rotatable rod member.

3. The aircraft towing device as set forth in claim 2 and said flexible connector includes an idler device for maintaining tension of said flexible connector.

4. The aircraft towing device as set forth in claim 1 and said shiftable slide member being mounted on said towing bar, said towing bar being tubular and said cable being housed therein.

5. The aircraft towing device as set forth in claim 1 and means for contacting and engaging the nose wheel or nose wheel strut of the aircraft arranged on the endmost portions of said pair of arms.

* * * * *